UNITED STATES PATENT OFFICE.

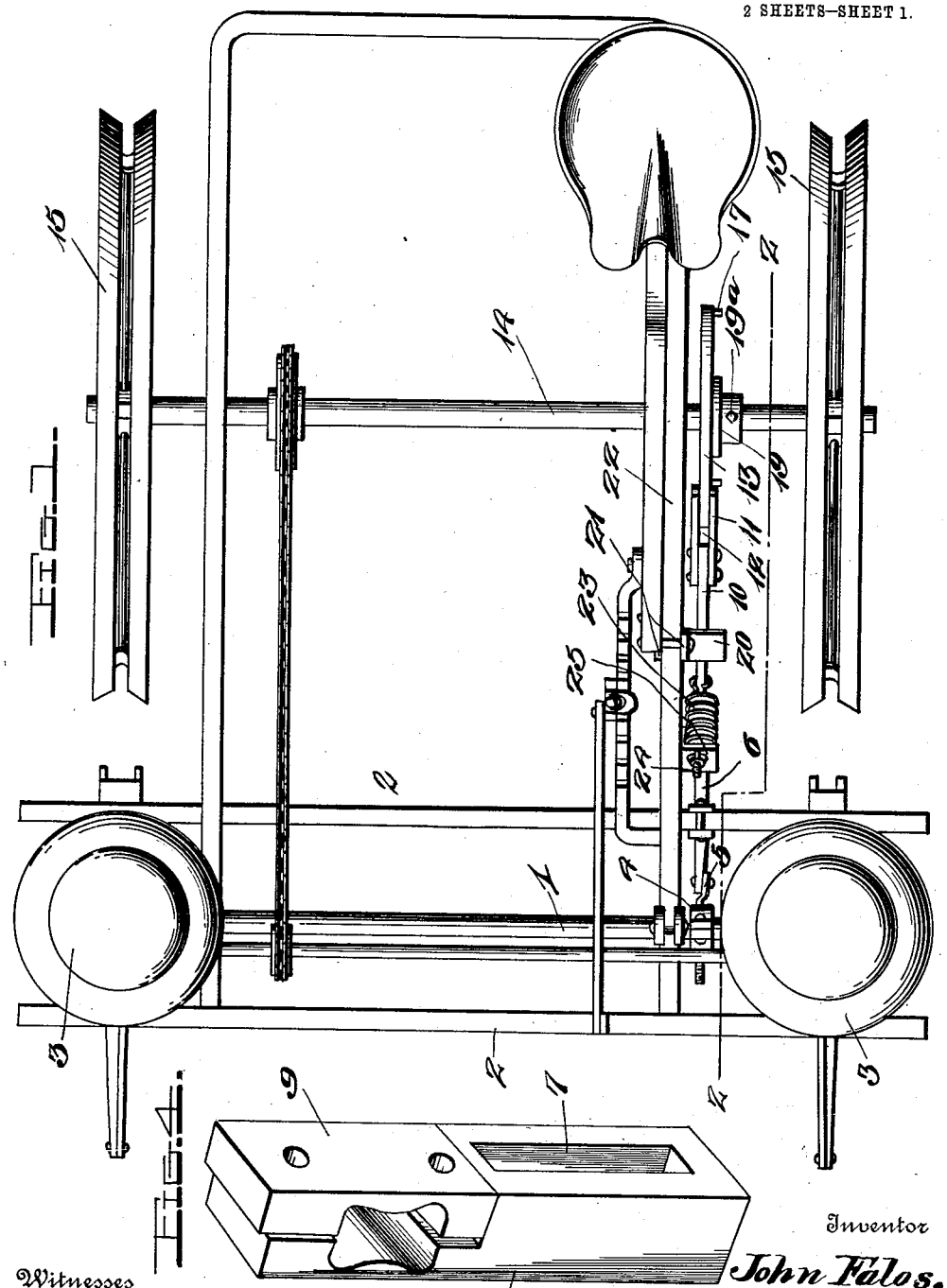

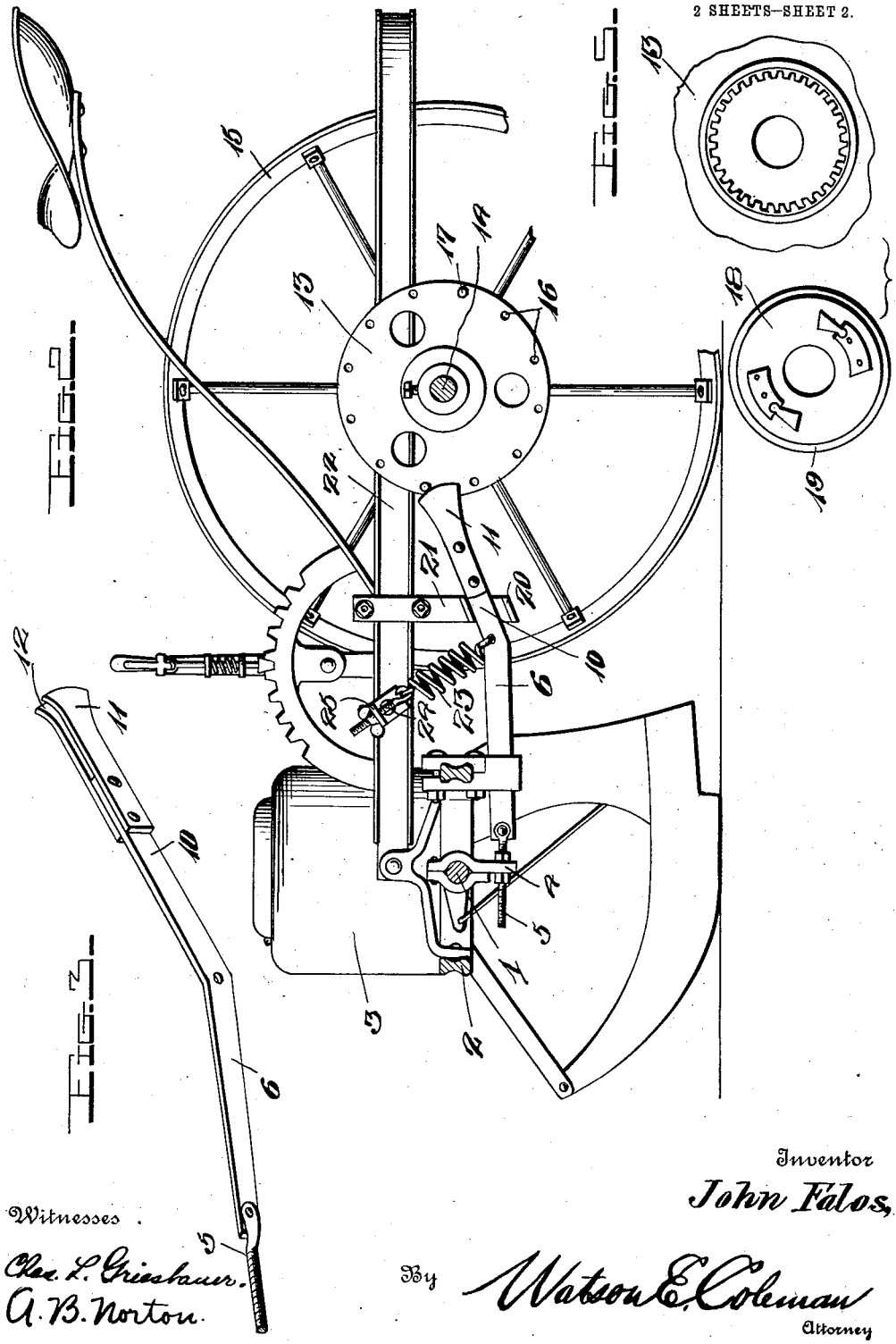

JOHN FALOS, OF EAST GRAND FORKS, MINNESOTA.

WIRELESS CHECK-ROW CORN-PLANTER.

1,033,236.  Specification of Letters Patent.  Patented July 23, 1912.

Application filed January 27, 1912. Serial No. 673,722.

*To all whom it may concern:*

Be it known that I, JOHN FALOS, a citizen of the United States, residing at East Grand Forks, in the county of Polk and State of Minnesota, have invented certain new and useful Improvements in Wireless Check-Row Corn-Planters, of which the following is a specification, reference being had to the accompanying drawings.

This invention comprehends certain new and useful improvements in agricultural machinery, and relates particularly to wireless check row corn planters.

The invention has for its primary object an improved machine of this character which will do entirely away with the use of a check wire and its concomitant parts and that will be so constructed and arranged that the seed corn may be dropped at varying intervals, so that the hills may be, say, either three or four feet apart.

The invention also has for its object a wireless check row corn planter including an attachment which may be incorporated in or added to any of the conventional types of planters and which, in operation, will be more effective and accurate than planters that are provided with check row wires. And the invention also aims to generally improve this class of devices and to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawings, in which—

Figure 1 is a top plan view of a wireless check row corn planter embodying the improvements of my invention; Fig. 2 is a side elevation thereof partly broken away; Fig. 3 is a perspective view of the actuating bar; Fig. 4 is a detail perspective view of one of the guides for said bar; and Fig. 5 illustrates in detail the ratchet mounting of the actuating disk.

Corresponding and like parts are referred to throughout and designated in the drawings by the same reference numerals.

Referring to the drawings, the numeral 1 designates the trip shaft, 2 the front and rear transverse frame bars, and 3 the seed boxes of a corn planter, all of these parts being of any desired type, construction and design and in connection with other parts hereinafter referred to, being specified for the purpose of illustration only.

My improved check row attachment includes a clip 4 which is designed to be secured to the trip shaft 1 underneath the frame bars 2, one member of the clip being apertured at its lower end to receive a link rod 5 held in adjusted position therein by lock nuts, as shown. The link rod 5 extends longitudinally of the frame and its rear end is pivotally connected to the forward end of a longitudinally extending actuating bar 6, said bar passing through the vertical, elongated slot 7 that is formed in a vertically disposed guide bar 8, secured to the rearmost frame bar 2 by a clip 9 or similar attachment means.

The actuating bar 6 is formed with a preferably upwardly and rearwardly inclined arm 10 to which is bolted or otherwise secured a shank 11 which, together with its inwardly forked end 12, forms a rear continuation of the actuating bar. The forked extremity 12 is designed to embrace the rim portion of a bar tripping element which, in the present instance, is in the form of a disk 13 mounted upon the main driving axle 14 that is supported by the ordinary ground or traveling wheels 15. The disk 13 is formed with any desired number of transversely extending apertures 16 arranged at predetermined distances from each other, according to the desired distances between the hills. In the present embodiment of the invention, these apertures are so disposed that the dropping of the corn may occur, in the forward travel of the machine, every three or four feet. The apertures 16 are designed to receive trip pins 17 adapted to come into contact with the rear edge of the arm 10 of the actuating bar 6, whereby an intermittent forward movement will be imparted to the bar so as to trip or oscillate the shaft 1 and actuate the seed dropping devices. In the present instance the disk 13 is of itself loosely mounted on the axle 14 and is coupled thereto by a ratchet collar 18 mounted in the hollow hub of the disk and a collar 19 secured to the axle, as by a set screw 19$^a$.

20 designates the laterally projecting lower ends of vertically disposed bars 21 that are fastened to opposite sides of one of the side frame bars 22 of the machine by bolts or similar fastening means, one of the laterally projecting ends being arranged above and slightly in advance of the other and said ends receiving between them the arm 10 of the bar 6, so as to properly guide the rear portion of the bar in the movements of the latter. A contractile spring 23 is secured in any desired way at its lower end to the bar 6 and is secured at its upper end to a suspension hook 24 which is adjustably mounted in the laterally projecting arm of an angular bracket 25 secured to the frame bar 22 near the forward end of the latter.

From the foregoing description in connection with the accompanying drawings the operation of my improved wireless check row corn planter will be apparent. In the practical use of the invention, the clip 4 is secured to the trip shaft 1, the guides 8 and 21 are secured in place, the actuating bar 6 is passed through the guide 8 and has the shank 11 bolted or otherwise secured to it, and the disk 13 is mounted as hereinbefore described upon the axle 14, its rim being received in the bifurcated rear end of the actuating bar. The pins 17 are secured in the apertures 16 in a predetermined manner, according to the distances desired between the hills. As the machine is drawn forwardly over the field, the disk 13 will bring the pins 17, one after the other, into engagement with the rear end of the actuating bar 6, and said bar will be intermittently tripped so as to actuate the trip shaft 1 at the required time.

It will thus be seen that I have provided a very simple, durable and efficient corn planter attachment which may be applied to any of the conventional types of corn planter without materially altering any parts thereof, and which may be constructed of few and simple parts that will be cheap to manufacture and easy to assemble.

By providing the disk 13 with the ratchet collar 18, it is obvious that the disk may be set by hand at the ends of the rows, in order to get the machine in line.

Having thus described my invention I claim:

1. The combination with the trip shaft and driving axle of a corn planter, of an actuating bar pivotally connected at its forward end to the trip shaft and extending rearwardly therefrom, a disk carried by the driving axle and provided with pins adapted to intermittently engage the rear end of the actuating bar, a slotted guide carried by the machine and through which the actuating bar freely passes, and upper and lower guides at the rear of said first named guide and through which the rear portion of the actuating bar passes, substantially as shown and described.

2. The combination with the trip shaft and driving axle of a corn planter, of an actuating bar pivotally connected at its forward end to the trip shaft, a disk carried by the driving axle and provided with pins adapted to intermittently engage the rear end of the actuating bar, bars carried by the machine and formed with laterally projecting lower ends embracing the rear portion of the actuating bar, one above and in advance of the other, and a spring secured to the machine and to the actuating bar, for the purpose specified.

3. The combination with the trip shaft and driving axle of a corn planter, of a clip operably connected to the trip shaft, a link adjustably connected to said clip, a longitudinally extending actuating bar pivotally connected at its forward end to said link, a disk carried by the driving axle and provided with pins adapted to intermittently engage the rear end of the actuating bar, supporting guides for said bar, and a contractile spring secured to said bar and to the machine, for the purpose specified.

4. The combination with the trip shaft and driving axle of a corn planter, of a clip secured to said trip shaft, a link rod adjustably connected to said clip, an actuating bar pivotally connected at its forward end to said link, the actuating bar being provided with an upwardly and rearwardly inclined arm, a shank connected to said arm and formed with a forked rear end, a disk carried by the driving axle and having its rim received in the forked end of said shank, pins carried by said disk and adapted to engage the rear end of said shank, to move the actuating bar, and a spring carried by the frame-work of the machine and secured to the actuating bar.

5. The combination with the trip shaft and driving axle of a corn planter, of an actuating bar operatively connected at its forward end to the trip shaft, a disk carried by the driving axle and provided with pins adapted to intermittently engage the rear end of the actuating bar, guiding supports for the actuating bar, a spring connected at one end to said bar, a bracket secured to the frame-work of the machine and extending laterally therefrom above the actuating bar, and a suspension hook carried by said bracket and secured to said spring.

In testimony whereof I hereunto affix my signature in the presence of two witnesses.

JOHN FALOS.

Witnesses:
M. E. BYE,
H. KROGSRUD.

Copies of this patent may be obtained for five cents each, by addressing the "Commissioner of Patents. Washington, D. C."